Jan. 5, 1932.  W. KAZANJI  1,839,969
FUR CUTTING MACHINE
Filed June 6, 1931  2 Sheets-Sheet 2
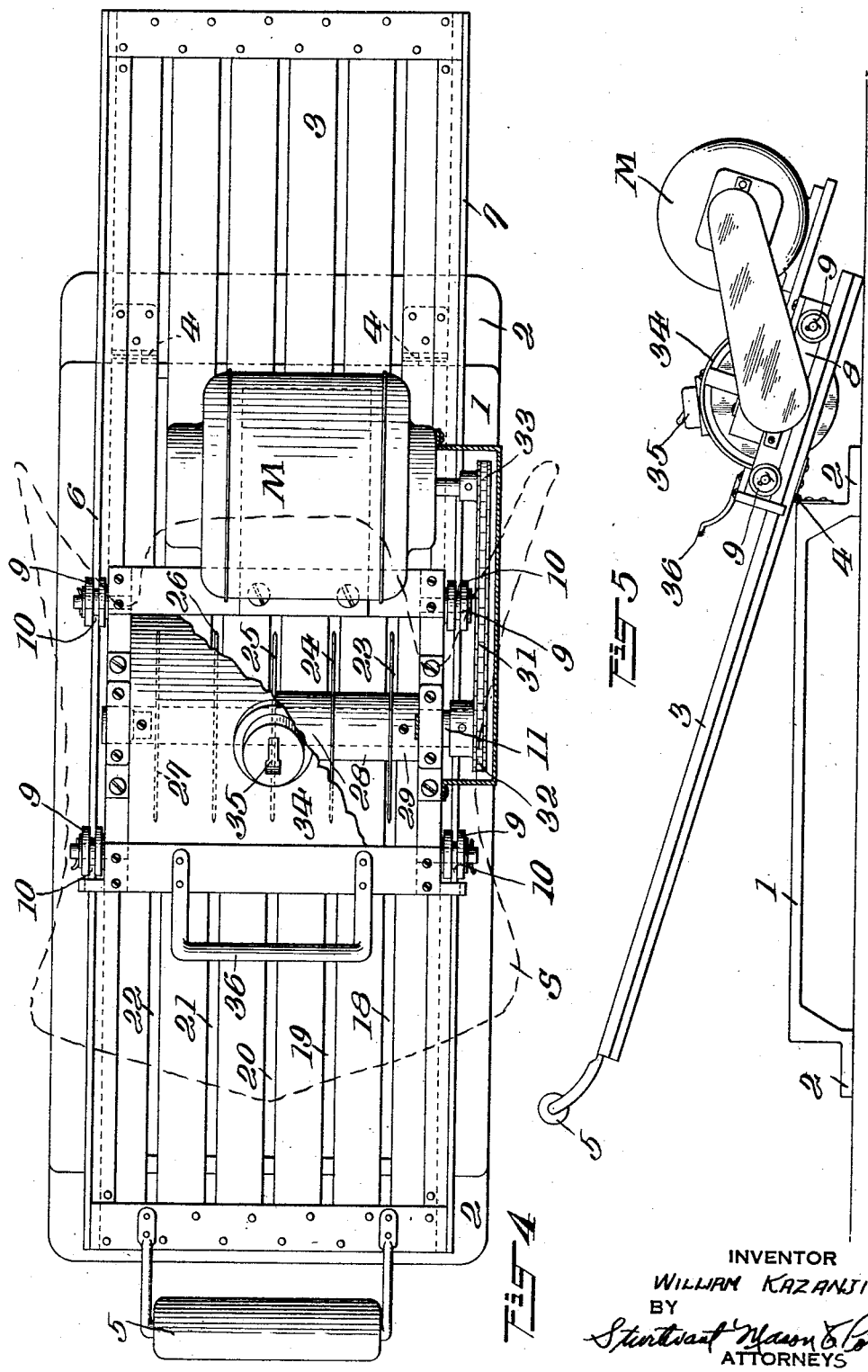
INVENTOR
WILLIAM KAZANJI
BY
*Sturtevant Mason & Porter*
ATTORNEYS Patented Jan. 5, 1932

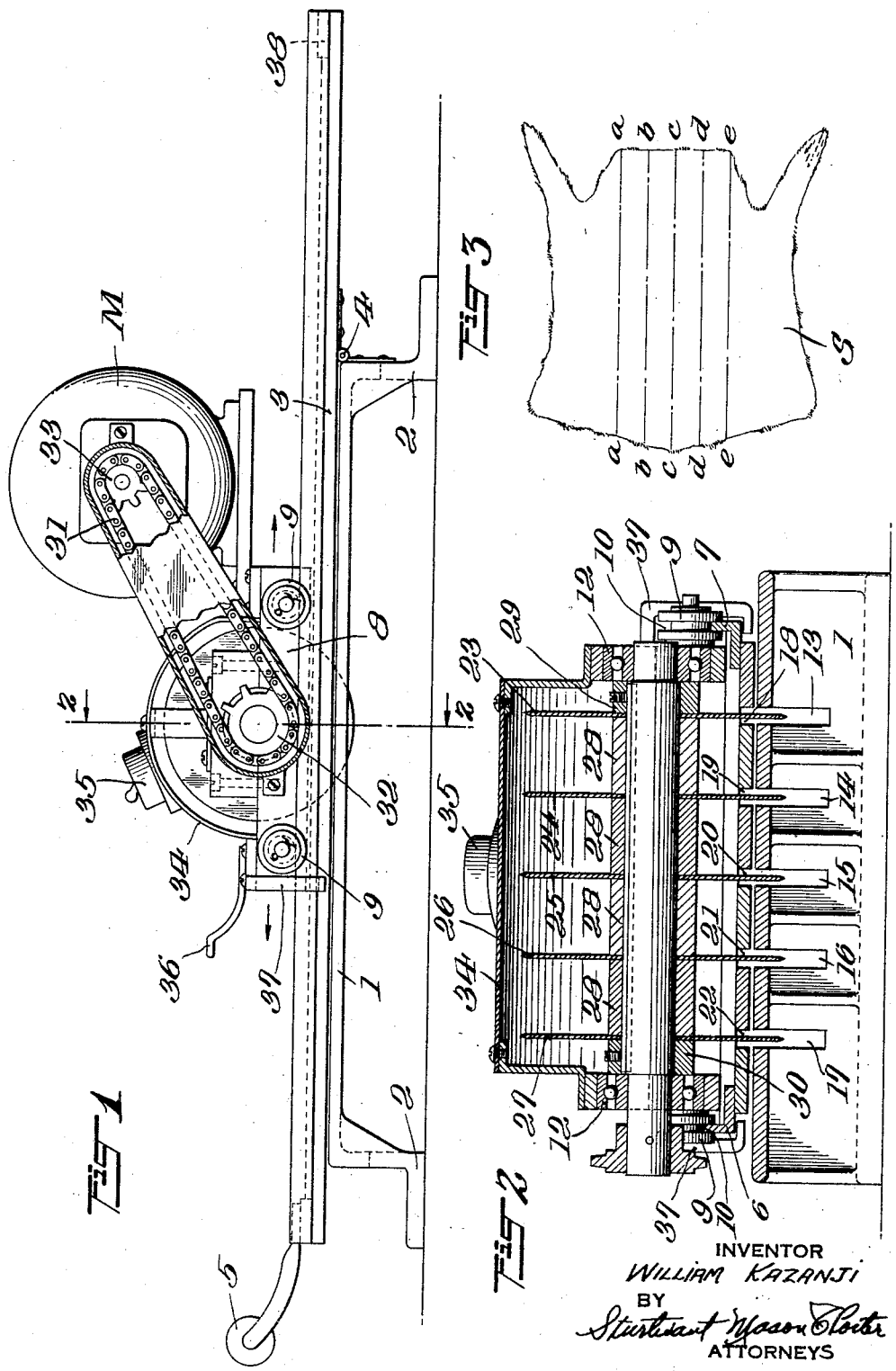

1,839,969

UNITED STATES PATENT OFFICE

WILLIAM KAZANJI, OF NEW YORK, N. Y.

FUR CUTTING MACHINE

Application filed June 6, 1931. Serial No. 542,642.

The invention relates to new and useful improvements in a fur cutting machine, and more particularly to a machine for cutting the skin into strips.

An object of the invention is to provide a machine wherein the skin may be firmly clamped and cut into strips by traveling rotary cutters mounted on a movable carriage carrying a motor for operating the cutters.

A further object of the invention is to provide a machine of the above type wherein the cutters are mounted so that they may be readily removed and reset on the operating shaft therefor.

A still further object of the invention is to provide a machine of the above type wherein the carriage is mounted for travel on a clamping member which is hinged to a supporting table with a portion of said clamping member extending beyond the table edge, so that when the carriage is moved on to said extension, the clamping member will be raised from engagement with the skin.

These and other objects will in part be obvious and will in part be hereinafter more fully disclosed.

In the drawings which show by way of illustration one embodiment of the invention—

Figure 1 is a side elevation with parts broken away and with the cutter carriage in the central position of its path of travel;

Fig. 2 is a section taken on the line 2—2 of Fig. 1;

Fig. 3 is a plan view of a skin upon which the machine is adapted to operate, with the lines on which the skin is cut indicated by dot and dash lines;

Fig. 4 is a plan view of the machine with parts broken away and with the cutter carriage in the same position as in Fig. 1; and Fig. 5 is a side elevation on a reduced scale with the carriage at its extreme retracted position and the clamping member raised thereby to permit the placing of the uncut skin or for the delivery of the cut skin.

The invention is directed broadly to a fur cutting machine which includes a supporting table to which is hinged a clamping member which extends substantially throughout the entire width of the table, and which projects both in front and in rear of the table. This clamping member is hinged to the table at the rear side thereof. The clamping member carries tracks on which a carriage moves back and forth, preferably by hand manipulation. Mounted in the carriage is a shaft carrying a plurality of cutters. Also mounted on the carriage is a motor which is geared to the shaft for rotating the same. Both the table and the clamping member are provided with slots in which the rotating blades operate for cutting the skin.

The invention will be better understood by a detail description of the illustrated embodiment of the invention. The machine includes a table 1 mounted on supporting legs 2, 2. Attached to the tabel 1 is a clamping member 3. Said clamping member is secured to the table by hinges 4 which are placed at the rear of the table, and are so connected to the clamping member that the clamping member may be shifted from the position shown in Fig. 1 to the position shown in Fig. 5, and which lifts the clamping member free from the top of the table. This clamping member 3 extends in front of the table and is provided with a handle 5 which may be readily grasped by the operator, for lowering the clamping member against the skin which is to be cut. A skin is indicated at S in Fig. 3 of the drawings. The purpose of the machine is to cut the skin along the lines a—a, b—b, c—c, d—d and e—e, thus forming narrow regular strips which may be selected and joined for the purpose of grading the fur in the article which is to be produced. Mounted on the clamping member 3 are rails 6 and 7. These rails are fixed to the clamping member and extend from the forward end to the rear end of the clamping member 3. These rails 6 and 7 form the track on which the carriage 8 is mounted for back and forth movement from one end to the other of said clamping member 3. The carriage is provided with wheels 9, 9 which are preferably grooved as indicated at 10 so as to run on the rails 6 and 7.

Mounted on the carriage is an actuating shaft 11. The carriage is provided with ball bearings 12, 12 in which this actuating shaft is mounted. The table 1 is provided with a series of slots 13, 14, 15, 16 and 17. The clamping member 3 is also provided with a series of slots 18, 19, 20, 21 and 22. The slots in the clamping member register with the slots in the table 1. Mounted on the shaft 11 is a series of cutter blades indicated at 23, 24, 25, 26 and 27. These cutter blades are keyed to the shaft so as to turn therewith. They are spaced from each other by collars 28. There is a collar between the adjacent blades. Secured to the shaft 11 outside of the blade 23 is a collar 29 attached thereto by a set screw. There is a collar 30 outside of the blade 27 which is attached to the shaft by a set screw. This makes up a unit cutter consisting of a series of blades which are simultaneously rotated when the shaft 11 is rotated. The blades are set so as to extend through the slots in the clamping member and the table. For example, the blade 23 extends through the slot 18 and the slot 13. Mounted on the carriage is a motor M. The motor M is connected, as shown, through a sprocket chain 31 to the shaft 11. There is a sprocket wheel 32 on the shaft 11 and a sprocket wheel 33 on the end of the motor shaft. Thus the shaft 11 may be rotated when the switch is manipulated for supplying the motor with the operating current. Covering the cutting blades on the shaft 11 is a shield 34 and a switch 35 controlling the motor is preferably attached to the shield. A handle bar 36 is attached to the carriage. A bracket 37 is attached to each side of the carriage, and this bracket has an inwardly projecting arm which extends beneath the rail with which it is associated, and this prevents the carriage from being lifted at its forward end from the rails.

The clamping member 3 extends to some distance in rear of the hinge 4 and is provided with a stop 38. When the carriage is moved to the extreme right-hand end of the clamping member 3, as viewed in Fig. 1, said clamping member will be swung on its hinge to the position shown in Fig. 5. This lifts the clamping member free from the table. The skin is then placed on the table as indicated in broken lines in Fig. 4, after which the operator grasping the handle 5, pulls the clamping member down on to the skin. This will clamp the skin firmly against the table. The operator then grasps the handle 36 and after starting the motor, moves the carriage forward, said carriage rolling along the track, and the skin will be cut into narrow strips along the lines as indicated in Fig. 3, without cutting through the hair, which will be pushed into the slots of the table out of the way of the cutting blades. After the skin has been cut, the carriage may be returned to the position indicated in Fig. 5, and the clamping member will be held raised so that the operator may use both hands for the placing of the next skin or fur for the next cutting operation.

It is obvious that the collars 28 may be removed from the shaft 11 and collars of different lengths substituted therefor for shifting the position of the cutting blades relative to each other, and thus the width of the strips cut may be varied within certain limits.

It will also be obvious that any one of the cutting blades may be omitted by removing the collars from the actuating shaft and reassembling the parts. It will also be obvious that if the spacing of the cutting blades is changed in the collars 28, the location of the slots in the table and clamping member may be correspondingly changed by substituting sections of different widths.

It is obvious that modifications may be made in the details of construction shown without departing from the spirit of the invention as set forth in the appended claims.

Having thus described the invention, what I claim as new and desire to secure by Letters Patent, is—

1. A fur cutting machine comprising a table, a clamping member attached to said table, a carriage movable back and forth on said clamping member, spaced rotary cutters mounted on said carriage, and means for rotating said cutters movable with the carriage, said clamping member and said table having registering slots in which said cutters operate for cutting a skin placed between the clamping member and the table into strips.

2. A fur cutting machine comprising a table, a clamping member hinged to the rear end of said table and extending beyond said hinge connection, rails running lengthwise of the clamping member from the front end to the rear end thereof, a carriage mounted on said rails, an actuating shaft mounted on said carriage and extending transversely thereof, a series of cutters mounted on said shaft, means carried by the carriage for rotating said shaft, said clamping member and said table having registering slots in which the cutters operate, said extension in rear of the hinges being of sufficient length so that when the carriage is moved on to said extension, the clamping member will be swung on its hinge and moved away from the table to aid in the placing and removing of the skin to be cut.

3. A fur cutting machine comprising a table, a clamping member hinged at the rear side of said table and extending to the front of the table, a handle attached to the front end of said clamping member, rails running lengthwise of said clamping member transversely across the table, a carriage, rollers attached to the carriage and mounted on said rails, whereby said carriage may be moved from one end of the rails to the other, an actuating shaft mounted transversely of said carriage, cutters mounted on said actuating shaft in spaced relation to each other, and a motor mounted on said carriage and geared to said shaft for operating the same, said clamping member and said table having slots registering with each other and receiving said cutting blades.

4. A fur cutting machine comprising a table, a clamping member hinged at the rear side of said table and extending to the front of the table, a handle attached to the front end of said clamping member, rails running lengthwise of said clamping member transversely across the table, a carriage, rollers attached to the carriage and mounted on said rails, whereby said carriage may be moved from one end of the rails to the other, an actuating shaft mounted transversely of said carriage, cutters mounted on said actuating shaft in spaced relation to each other, a motor mounted on said carriage and geared to said shaft for operating the same, said clamping member and said table having slots registering with each other and receiving said cutting blades, a handle attached to said carriage whereby the same may be moved along the tracks, and a switch adjacent the handle for controlling the motor.

5. A fur cutting machine comprising a table, a clamping member hinged at the rear side of said table and extending to the front of the table, a handle attached to the front end of said clamping member, rails running lengthwise of said clamping member transversely across the table, a carriage, rollers attached to the carriage and mounted on said rails, whereby said carriage may be moved from one end of the rails to the other, an actuating shaft mounted transversely of said carriage, cutters mounted on said actuating shaft in spaced relation to each other, a motor mounted on said carriage and geared to said shaft for operating the same, said clamping member and said table having slots registering with each other and receiving said cutting blades, a handle attached to said carriage whereby the same may be moved along the tracks, and a switch adjacent the handle for controlling the motor, said clamping member being extended in rear of the hinge so that when the carriage is moved on to the extension, the clamping member will be raised from the table.

In testimony whereof, I affix my signature.

WILLIAM KAZANJI.